United States Patent
Edelman et al.

(10) Patent No.: US 12,016,258 B2
(45) Date of Patent: Jun. 25, 2024

(54) SEED TREATMENT METHOD INCORPORATING AN INCLINE MIXING CONVEYOR

(71) Applicant: KSI Conveyor, Inc., Sabetha, KS (US)

(72) Inventors: Matthew J. Edelman, Sabetha, KS (US); Jason P. Kaeb, Sabetha, KS (US); Paul A. Kaeb, Sabetha, KS (US)

(73) Assignee: KSI Conveyor, Inc., Sabetha, KS (US)

( * ) Notice: Subject to any disclaimer, the term of this patent is extended or adjusted under 35 U.S.C. 154(b) by 1001 days.

(21) Appl. No.: 16/947,334

(22) Filed: Jul. 29, 2020

(65) Prior Publication Data
US 2021/0031156 A1  Feb. 4, 2021

Related U.S. Application Data

(60) Provisional application No. 62/879,940, filed on Jul. 29, 2019.

(51) Int. Cl.
*A01C 1/06* (2006.01)
*A01C 1/00* (2006.01)
(Continued)

(52) U.S. Cl.
CPC .................. *A01C 1/06* (2013.01); *A01C 1/00* (2013.01); *B01F 23/54* (2022.01); *B01F 23/60* (2022.01);
(Continued)

(58) Field of Classification Search
None
See application file for complete search history.

(56) References Cited

U.S. PATENT DOCUMENTS

| | | |
|---|---|---|
| 2,580,854 A | 1/1952 | Sherman |
| 2,880,522 A | 4/1959 | Rollins |

(Continued)

FOREIGN PATENT DOCUMENTS

| | | |
|---|---|---|
| CN | 204223801 U | 3/2015 |
| CN | 207491478 U | 6/2018 |

(Continued)

OTHER PUBLICATIONS

Latteux Luc, Plant for processing waste recycling has adjustable regulator measuring height of material layer leaving plant and pegs ensuring rabbling of binder/material mixture, 5 pages, This is a machine translated text of a patent application originally published on Jul. 28, 2000, France, No. FR2788795A1.

(Continued)

*Primary Examiner* — Michael P. Rodriguez
(74) *Attorney, Agent, or Firm* — Coughlin Law Office LLC; Daniel J. Coughlin; Stuart M. Aller

(57) ABSTRACT

A seed treatment system incorporates an incline conveyor to mix freshly treated seed. A metered seed flow is maintained. A treatment applicator positioned above a tail end of the incline conveyor applies a seed treatment to the metered seed flow to form a treated seed flow. The treated seed flow freefalls into a transition zone and pre-mixes before moving upward within the incline conveyor. An eddy may form within the treated seed flow due to a partial obstruction within the incline conveyor. A prescribed amount of the treated seed flow backflows into the eddy in a cascading manner. Backflow movement may be contrary to conveyance of a substantial amount of the treated seed up through the incline conveyor. The seed treatment distributes about the treated seed flow within the incline conveyor. The treated seed flow discharges with complete cleanout at a head end of the incline conveyor.

18 Claims, 15 Drawing Sheets

(51) Int. Cl.
  *B01F 23/50* (2022.01)
  *B01F 23/60* (2022.01)
  *B01F 25/431* (2022.01)
  *B01F 35/53* (2022.01)
  *B29B 7/30* (2006.01)
  *B29B 7/58* (2006.01)
  *B29B 7/60* (2006.01)
  *F26B 3/06* (2006.01)
  *F26B 15/12* (2006.01)
  *F26B 15/22* (2006.01)
  *F26B 21/00* (2006.01)
  *F26B 25/14* (2006.01)
  *A01C 1/08* (2006.01)
  *B01F 101/09* (2022.01)

(52) U.S. Cl.
  CPC .... *B01F 25/4316* (2022.01); *B01F 25/43161* (2022.01); *B01F 25/431971* (2022.01); *B01F 35/531* (2022.01); *B29B 7/30* (2013.01); *B29B 7/584* (2013.01); *B29B 7/60* (2013.01); *F26B 3/06* (2013.01); *F26B 15/12* (2013.01); *F26B 15/22* (2013.01); *F26B 21/004* (2013.01); *F26B 25/14* (2013.01); *A01C 1/08* (2013.01); *B01F 2101/09* (2022.01); *B01F 2215/0422* (2013.01); *F26B 2200/06* (2013.01); *F26B 2200/08* (2013.01)

(56) References Cited

U.S. PATENT DOCUMENTS

| | | | |
|---|---|---|---|
| 3,096,212 | A | 7/1963 | Rosenleaf |
| 3,693,942 | A | 9/1972 | Foucault |
| 3,968,771 | A | 7/1976 | Walgenbach et al. |
| 4,125,332 | A | 11/1978 | Shmednecht |
| 4,582,047 | A | 4/1986 | Williams |
| 4,591,275 | A | 5/1986 | Garthus |
| 4,910,880 | A | 3/1990 | Cole |
| 5,005,514 | A | 4/1991 | Verrico |
| 5,052,545 | A | 10/1991 | Gongen |
| 5,407,692 | A | 4/1995 | Caridis et al. |
| 5,435,945 | A | 7/1995 | Paoli et al. |
| 5,499,873 | A | 3/1996 | Cummins et al. |
| 5,615,606 | A | 4/1997 | Vos |
| 5,622,561 | A | 4/1997 | Cummins et al. |
| 6,209,259 | B1 | 4/2001 | Madigan et al. |
| 6,422,381 | B1 | 7/2002 | Eberle et al. |
| 8,292,065 | B1 | 10/2012 | Neufeld et al. |
| 8,646,383 | B1 | 2/2014 | Howard |
| 9,096,376 | B1 | 8/2015 | Wood et al. |
| 9,790,031 | B2 | 10/2017 | Stenson et al. |
| 9,957,109 | B2 | 5/2018 | Kaeb et al. |
| 10,986,770 | B2 | 4/2021 | Forsyth |
| 11,242,209 | B2 | 2/2022 | Graff et al. |
| 11,612,868 | B2 | 3/2023 | Jagan |
| 2004/0177769 | A1 | 9/2004 | Kobayashi |
| 2013/0168209 | A1 | 7/2013 | Fanshier et al. |
| 2015/0359164 | A1 | 12/2015 | Bardi |
| 2018/0124994 | A1 | 5/2018 | Kaeb et al. |
| 2019/0009989 | A1 | 1/2019 | Francisco |
| 2019/0075712 | A1 | 3/2019 | Reineccius et al. |
| 2019/0239417 | A1* | 8/2019 | Forsyth .................... B05C 3/10 |
| 2021/0029867 | A1 | 2/2021 | Edelman |
| 2021/0094060 | A1 | 4/2021 | Heinen |
| 2021/0094066 | A1 | 4/2021 | Heinen |
| 2021/0380345 | A1 | 12/2021 | Kuckoski et al. |
| 2023/0085702 | A1 | 3/2023 | Schmehl et al. |

FOREIGN PATENT DOCUMENTS

| | | |
|---|---|---|
| FR | 2618040 A1 | 1/1989 |
| FR | 2703268 A1 | 10/1994 |
| FR | 2788795 A1 | 7/2000 |
| GB | 221642 A | 9/1924 |
| GB | 2152396 A | 8/1985 |
| KR | 1020140121508 A | 10/2014 |
| SU | 1166785 A1 | 7/1985 |
| SU | 1496755 A1 | 7/1989 |
| WO | 2022036342 A1 | 2/2022 |

OTHER PUBLICATIONS

AGI, Storm Pro Seed Treater, Storm Pro 2018, Nov. 28, 2017, 4 pages, vol. 1, www.aggrowth.com, Saskatchewan, Canada.

et al., A kind of automatically adjustable conveyor belt mixing device, 5 pages, This is a machine translated text of a patent application originally published on Mar. 25, 2015, China No. CN204223801U.

Luc Latteux, et al., Plant for processing waste recycling has adjustable regulator measuring height of material layer leaving plant and pegs ensuring rabbling of binder/material mixture, 5 pages, This is a machine translated text of a patent application originally published on Jul. 28, 2000, France, No. FR2788795A1.

Арнольд Дмитриевич Селезнев, et al., Apparatus for metering, mixing and conveying loose materials, 4 pages, This is a machine translated text of a patent application originally published on Jul. 15, 1985, Soviet Union, No. SU1166785A1.

Виталий Кириллович Лысак, et al., Apparatus for metering, mixing and conveying loose materials, 4 pages, This is a machine translated text of a patent application originally published on Jul. 30, 1989, Soviet Union, No. SU1496755A1.

Benoit, Dion, Appliance for coating seeds in bulk form, by means of a liquid treatment product, This is a machine-translated text of a patent application originally published on Jan. 20, 1989 in France, No. FR2618040A1.

Jiyuan Chaoqun Agricultural Technology Development Co., Ltd, A kind of agricultural seed mixes medicine device, 5 pages, This is a machine translated text of a patent application originally published on Jun. 15, 2018, China, No. CN207491478U.

Louis, Pollione, Apparatus for moistening powdery materials, especially those of the type having hydraulic (water-based) binders, This is a machine translated text of a patent originally published on Oct. 7, 1994 in France, No. FR2703268A1.

손창구, Grain Drier, 8 pages, This is a machine translation of a patent application originally published on Oct. 16, 2014, South Korea, No. KR20140121508A.

ECNNET Co., Ltd, et al., The blending method and the apparatus for auto-controlling ratio of size of recycling aggregate, 32 pages, This is a machine translation of a foreign patent originally published on Nov. 2, 2007 as KR100773067B1, Korea.

\* cited by examiner

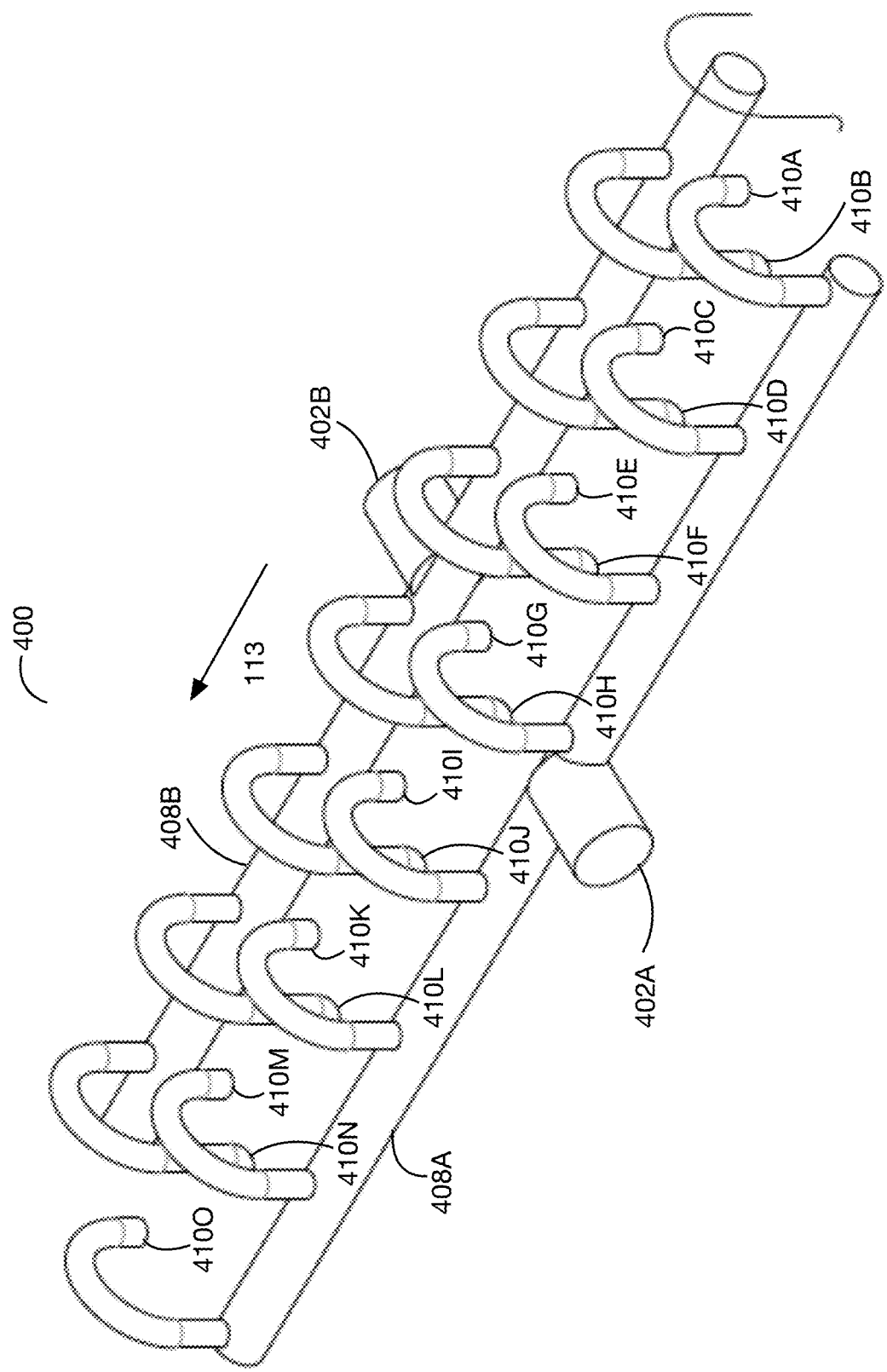

SEED TREATMENT METHOD INCORPORATING AN INCLINE MIXING CONVEYOR

CROSS-REFERENCES

This application claims the benefit of U.S. Provisional Application No. 62/879,940 filed 29 Jul. 2019, which is incorporated by reference herein in its entirety.

GOVERNMENT RIGHTS

Not Applicable.

REFERENCE TO CDS

Not Applicable.

FIELD

The present disclosure relates to a conveyor with a belt forming a trough, the conveyor capable of mixing, drying, conditioning, and applying a treatment material to a particulate material during conveyance.

BACKGROUND

Agricultural seeds are often treated with treatments such as insecticides, fungicides, and other compositions before planting. The time window for planting—when the weather is warm enough and the fields are dry—is often very short. This means the seed dealer must quickly treat and deliver a high volume of seed to farmers who are ready to plant their fields. These seed treatments are commonly applied by spraying a liquid composition to the surface of seed, which requires a smaller quantity of seed treatment composition than the traditional field application of treatment fluids.

SUMMARY

The last stage of treating seeds involves mixing and drying the wet, freshly treated seed. Seed treatment systems generally incorporate a mixing drum, such as the mixing drum disclosed in U.S. Pat. Nos. 8,985,931 and 10,194,577, both patents by Terry N. Kaeb et al and assigned to KSi Conveyor, Inc., the disclosure of which are incorporated by reference herein in its entirety. Drying drums can be expensive and take up substantial space. Alternative post-treatment plant seed mixing methods include screw conveyors, such as conventional steel augers, brush augers, and poly cupped flighting augers. Users may prefer belt conveyors over screw conveyors for transferring plant seeds. Belt conveyors are an effective solution for transporting particulate material at an incline. An endless belt is looped around rollers at the head and tail end of the conveyor. The endless belt may be spliced or made without splicing. The endless belt may incorporate texture on the carrying surface to assist with traction for carrying the load up an incline. For example, the carrying surface can incorporate chevrons to assist with carrying the load.

In general, the disclosure features a conveyor having a conveyance structure. Partially disposed within the conveyance structure is a belt. A gas manifold, having one or more manifold outlets, may be disposed within or on an exterior of the conveyance structure.

The conveyor may include a lid or sidewall through which the manifold outlets pass. A plurality of mixing baffles may be longitudinally spaced apart through the conveyor in a laterally alternating manner. The plurality of manifold outlet ports, operably connected to the manifold, may be disposed laterally adjacent to the mixing baffles. The manifold may be operably connected to a vacuum source or pressurized air source. A filter may be disposed between the manifold and the vacuum source. A recirculating air system may provide the vacuum source and the pressurized air source. A vacuum port may be disposed at a head end of the conveyor.

A stream of particulate matter may be conditioned with a conveyor. A pressurized gas source is connected to a portion of the conveyor. The stream of particulate material, such as seed, is carried through the conveyor on a belt. A mixing baffle induces turbulent backflow in the stream of particulate material.

Debris may be extracted from the stream of particulate material with a negative pressure connected to the conveyor from the pressurized gas source. Humid air may be extracted from the conveyor with a negative pressure connected to the conveyor from the pressurized gas source. Introduce gas into the conveyor with a positive pressure from the pressurized gas source. The gas introduced into the conveyor may be atmospheric air or conditioned air, such as dehumidified air.

The mixing and drying conveyor can be used for treating and overtreating seed. A metered stream of particulate material is provided to a first applicator. The metered stream of particulate material treated with a first treatment in the first applicator. The metered stream of particulate material having the first treatment is transferred to a second applicator. The stream of particulate material having the first treatment is then treated with a second treatment.

The metered stream of particulate material having the first treatment is mixed in a first conveyor with a plurality of mixing baffles. The metered stream of particulate material having the first treatment is dried in the first conveyor by providing pressurized gas to the first conveyor. The metered stream of particulate material having the second treatment can be mixed in the second conveyor with a plurality of mixing baffles. The metered stream of particulate material having the second treatment can be dried in the second conveyor by providing pressurized gas within the second conveyor.

BRIEF DESCRIPTION OF DRAWINGS

Aspects are illustrated by way of example, and not by way of limitation, in the accompanying drawings, wherein:

FIG. 15 shows a top-side perspective view of a conditioning apparatus having two gas manifolds.

DETAILED DESCRIPTION

Figure 1:
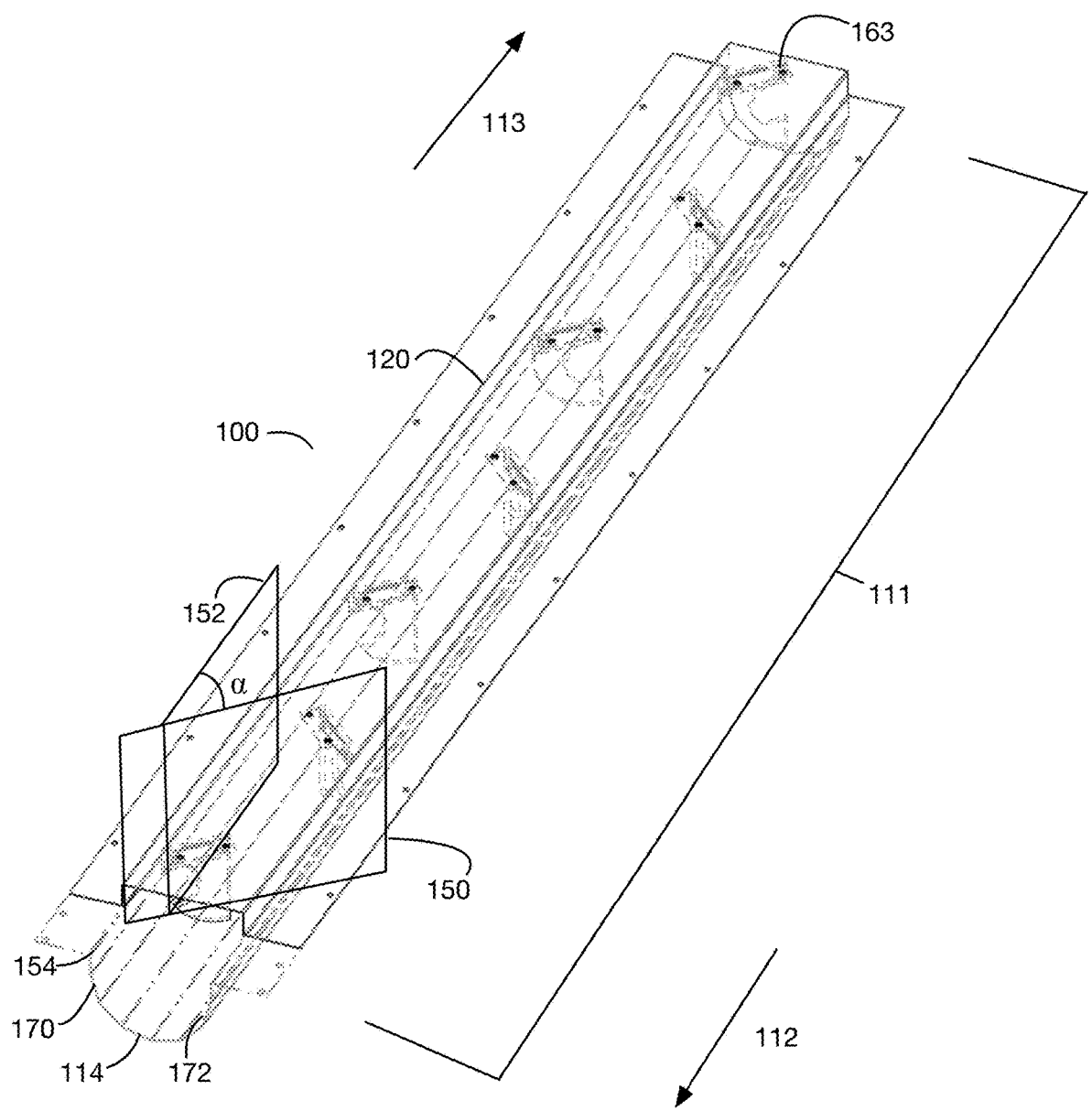
FIG. 1 shows a top-side perspective view of a curvilinear structure of the conveyor with the contents of the conveyor below the lid shown in dashed lines.

FIG. 1 shows an internal view of a conveyor 110 with mixing apparatus 100. The mixing apparatus may mix and dry particulate material during transportation up the incline belt conveyor. The particulate material is carried on the belt through the curvilinear structure 114. The curvilinear structure 114 comprises the lower trough of the conveyor, through which the belt (not shown) travels. When the belt travels through the curvilinear structure, the belt takes on a similar curvilinear cross section. As the belt conforms to the curvilinear structure 114 when the belt moves through the transition portion of the conveyance structure. The particulate material is carried on the belt, as the belt is driven with a driven roller, through the curvilinear structure. Conforming the belt to the curvilinear structure provides a bed depth for increased transportation rates, provides side support for more aggressive mixing, and allows for complete cleanout of particulate matter at the head end of the conveyor. The complete cleanout of particulate matter may be advantageous when conveyors are moving material such as treated seed where customers are sensitive to cross-contamination.

The belt has a carrying surface, which engages the particulate matter. The belt is endless, in that it is wrapped around a head roller and a tail roller, to make a continuous path. The belt may be spliced. The belt may be a solid woven belt with a cover such as a PVG Belt, Continental PVG 120S1 CBb. The PVG belt may have a polyester, single-ply interwoven outer cover. The PVG belt provides low stretch, excellent fastener retention, and good tear and wear resistance. The cover may also resist reactivity with seed treatment. Alternatively, the belt may be a solid woven belt with a cover of polyvinyl chloride or be a belt made wholly of rubber, or other materials.

The moving belt of the conveyor transports particulate material from a tail end to a head end (in a downstream direction, shown in arrow 113) as shown in FIG. 1. The rate of transfer or belt speed may range from 80 to 140 meters per minute (approximately 250 to 450 feet per minute). In one example, the belt transfers particulate material at a volume of 360 kilograms (approximately 800 pounds) per minute with a belt speed of 110 meters per minute (approximately 350 feet per minute). The belt may have a texture projection on the carrying surface to assist with traction and transfer of the particulate material up an incline. For example, the carrying surface can incorporate texture projections such as raised crescents, chevrons, or herringbones to assist with carrying the load on a solid belt. Raised chevrons may be beneficial in conveying the load during mixing. It may be beneficial to limit the height of the texture projection to less than 2.54 cm (1 inch), less than 1.904 cm (¾ inch), less than 1.27 cm (½ inch), or less than 0.635 cm (¼ inch), so the texture projection does not protect a substantial amount of the seed bed from interaction with the mixing baffles and to prevent the mixing baffles contacting the texture projection. The texture projection may be angled 90-degrees to maintain a perpendicular axis to the plane of the belt surface. Alternatively, the texture projections may be angled upstream, with an obtuse angle away from the perpendicular axis to the plane of the belt surface. Alternatively, the texture projections may be angled downstream, with an acute angle away from the perpendicular axis to the plane of the belt surface.

The linear edges of the belt may be protected by a longitudinal guard. The guard may be L-shaped, C-shaped, or overlap the belt with a rounded lip or planar projection. The guard may be made from low- or high-density polyethylene, polytetrafluoroethylene, or ultra-high molecular weight polyethylene, or other material that provides impact, chemical, abrasion, and moisture-resistance and a low-friction surface. The guard may be disposed between the linear edges of the lid 120 and the outside edge of the curvilinear structure 114. The guard overlaps the belt to prevent particulate material from wedging between the belt and the trough of the curvilinear structure 114. The guard may prevent loss of seed, damage to seed, cross-contamination, and belt wear by preventing the turbulent flow of seed from entering between the belt and the curvilinear structure 114.

We recognized that a plurality of mixing baffles may be incorporated into a belt conveyor to mix seed—or other particulate material—being transported on the belt. Inserting a plurality of mixing baffles into the stream of the particulate material induces a turbulent backflow of the particulate material. Backflow of seed during conveyance may be generally regarded as contrary to the transportation purpose of conveyance in an incline conveyor. However, we recognized that backflow of seed could be induced to mix seed during belt conveyor transference. In the case of wet, freshly treated plant seed, this backflow may cause a mixing, polishing, and drying of the plant seed. Mixing distributes the seed treatment into an even coat by rubbing the individual seeds of the seed flow stream together. The belt movement generates the seed stream flow, which is then divided and mixed using the static mixing baffles.

Figure 2:
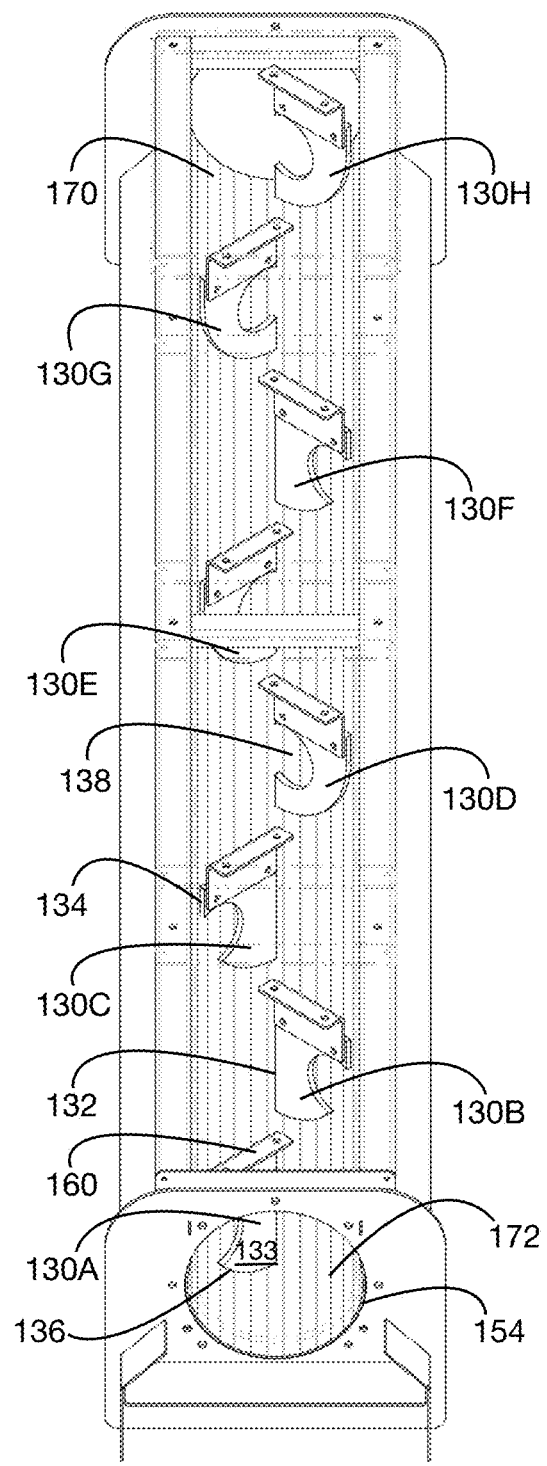
FIG. 2 shows a top perspective view of a curvilinear structure of the conveyor with the lid removed showing alternating baffles.

As shown in FIG. 2, the mixing apparatus 100 may comprise a plurality of mixing baffles 130A, 130B, 130C, 130D, 130E, 130F, 130G, 130H referred to in general as mixing baffles 130. Utilizing mixing baffles within the conveyor 110 may eliminate the need for a mixing and drying drum, which may decrease the cost, time, and operational footprint of a seed treatment system.

The mixing baffles partially obstruct the flow of seed, inducing a turbulent backflow, in an amount prescribed based on the shape and structure of the mixing baffles. The backflow disrupts the flow of the seed within the curvilinear structure 114. An eddy or pocket within the seed flow stream may form behind the mixing baffles. The eddy may fill with gravity-induced backflow of seed from downstream thereby providing further mixing. The mixing baffles 130 may be made of a rigid durable material such as ultra-high-molecular-weight polyethylene, acrylonitrile butadiene styrene, steel, or other sufficiently rigid and durable material. Mixing baffles are longitudinally spaced apart within the curvilinear structure at a set distance above the carrying surface of the belt, or above the top of the texture projection As shown in FIG. 2, the mixing baffles 130 are mounted such that the downstream portion of the mixing baffle extends inwardly toward the center of the conveyor 110. A first mixing baffle 130A is mounted on a first lateral side 170 of the conveyor 110. The first mixing baffle is slanted relative to the longitudinal axis of the conveyor. The slant of the mixing baffle directs lateral movement of the particulate material from the first lateral side 170 to a second lateral side 172 of the conveyor 110. The particulate material may ricochet off the upstream surface 133 of the first mixing baffle 130A, causing the particulate material to move backwards (upstream, see arrow 112 in FIG. 1) in the longitudinal axis of the conveyor and towards the opposite lateral side. The first mixing baffle is mounted to the conveyor with a peripheral portion 134 disposed upstream of a central portion 132. The first mixing baffle can be mounted at less than a 50° angle (see angle α in FIG. 1) between a first plane 150 defined by the first mixing baffle 130A and a vertical plane 152 tangential to the curvilinear structure 114 of the conveyor 110 at the sidewall 154. In the situation where the particulate material is a quantity of a plant seed partially covered with a wet seed treatment, inducing backflow, and directing lateral movement spreads the wet seed treatment about the quantity of the plant seed.

As shown in FIGS. 1 and 2, the mixing baffles 130 are disposed in alternating lateral sides. A first plurality of mixing baffles 130A, 130C, 130E, and 130G are disposed on the first lateral side 170 of the conveyor 110. A second plurality of mixing baffles 130B, 130D, 130F, and 130H are disposed on the second lateral side 172 of the conveyor 110. In this orientation, the first plurality of mixing baffles disposed on the first lateral side 170 cause seed to move from the first lateral side 170 to the second lateral side 172. In a similar manner, the second plurality of mixing baffles disposed on the second lateral side 172 cause particulate material to move from the second lateral side 172 to the first lateral side 170.

The mixing baffles 130 may be spaced apart longitudinally through a longitudinal portion 111 of the conveyor 110. The mixing baffles 130 may be spaced apart every twelve inches. Seven mixing baffles may be disposed longitudinally within an eight-foot section of curvilinear structure as shown in FIG. 1. The curvilinear structure may have an eight-inch diameter cross section. Alignment of the mixing baffles may be: first baffle 130A is on the first lateral side 170, with a first passage disposed in a first peripheral portion; second baffle 130B is on the second lateral side 172, with a second passage disposed in a second peripheral portion; third baffle 130C is on the first lateral side 170, with a third passage disposed in a third peripheral portion; the fourth baffle 130D is on the second lateral side 172, with a fourth passage disposed in a central portion. Alternatively, the pattern of the passage location may alternate between being in a central portion 132 of certain mixing baffles and disposed in a first peripheral side 134 of other mixing baffles.

As shown in FIG. 2, eight mixing baffles may be disposed longitudinally within a section of curvilinear structure. The curvilinear structure may have a nine-inch diameter cross section. A preferred pattern puts the passages in alternating locations, where a first mixing baffle 130A is disposed in the first lateral side 170 with a peripheral passage, followed by a second mixing baffle 130B disposed in the second lateral side 172 with a peripheral passage, followed by a third mixing baffle 130C disposed in the first lateral side with a peripheral passage, followed by a forth mixing baffle 130D disposed in the second lateral side with a central passage 138, followed by a fifth mixing baffle 130E disposed in the first lateral side with a central passage, followed by a sixth mixing baffle 130F disposed in the second lateral side with a peripheral passage, followed by a seventh mixing baffle 130G disposed in the first lateral side with a central passage, and lastly followed by an eighth mixing baffle 130H disposed in the second lateral side with a central passage. In this pattern, there is no clear passage for a portion of the particulate stream to travel through the curvilinear structure of the incline conveyor without encountering a mixing baffle. The pattern of the passage may alternate between inducing greater backflow within a central portion of the curvilinear structure 114 in a first section of the conveyor 110, where mixing baffles contain a peripheral passage, followed by a second section with greater backflow along the lateral sides of the curvilinear structure 114, where mixing baffles contain a central passage. At points along the longitudinal axis of the conveyor, backflow may deviate from the pattern of the passage by inserting a mixing baffle, where the passage deviates from the adjacent mixing baffles in that section of the conveyor 110.

Figure 3:
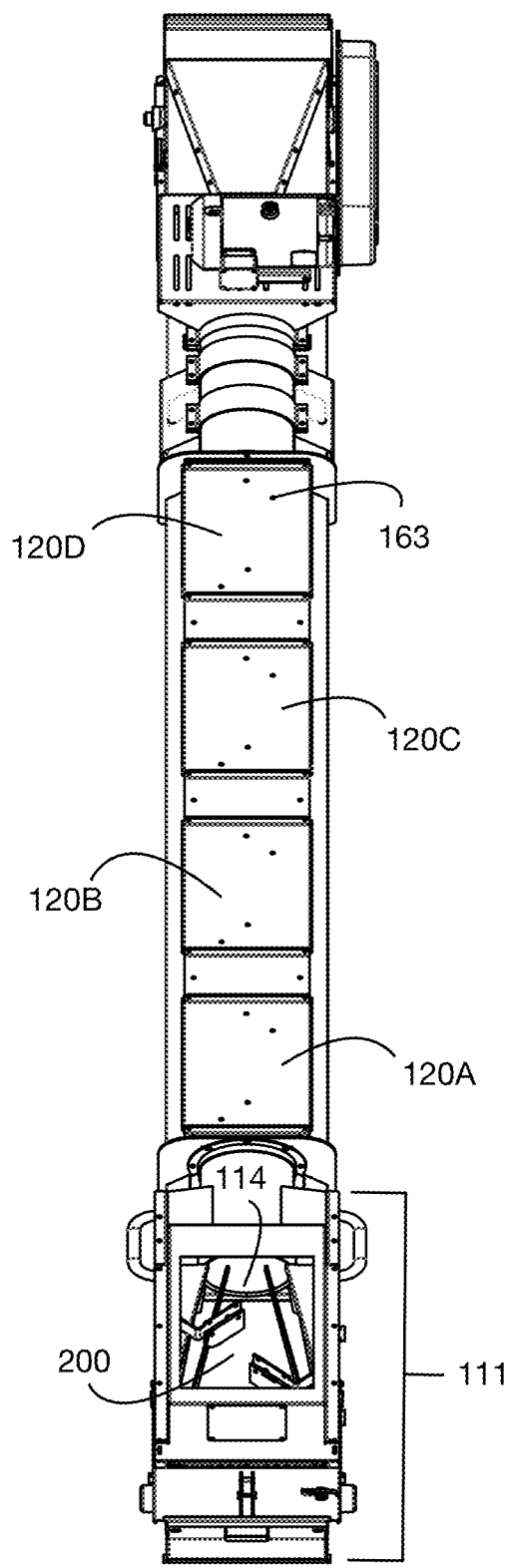
FIG. 3 shows a top perspective view of a transition zone and conveyor with the lids shown in place.
Figure 4:
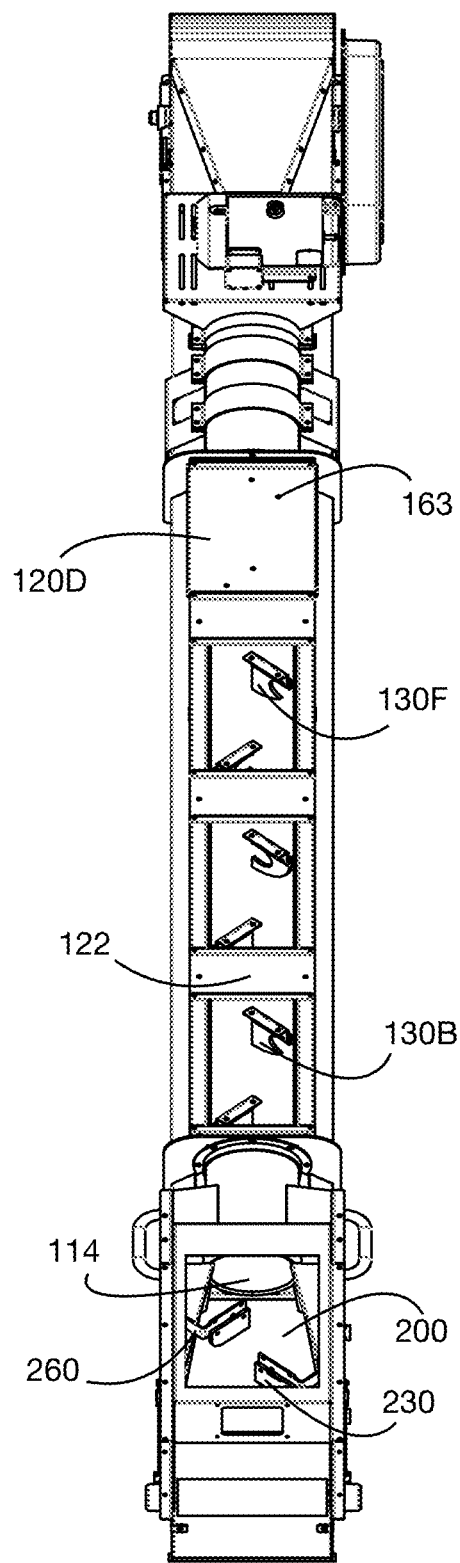
FIG. 4 shows a top perspective view of the transition zone and conveyor with lids removed showing the alternating mixing baffles in place.

As shown in FIGS. 3 and 4, one or more mixing baffles 130 may be mounted to an underside of a plurality of removable lid sections 120A, 120B, 120C, 120D, referred to in general as a lid 120. The lid mounts to the curvilinear structure 114 or another portion of the conveyance structure. The lid prevents rain and debris from entering the conveyor 110 as well as preventing particulate material from exiting the conveyor 110. The mixing baffles 130 are mounted directly to and perpendicular to the lid 120 with an L-shaped mounting bracket 160 as shown in FIG. 2. As shown in FIGS. 1 and 3, a lid 120 may comprise a plurality of apertures 163 corresponding to the mounting position of the mixing baffles 130. Alternatively, the mixing baffles 130 may be mounted to scaffolding or directly to the conveyor frame (not shown). The scaffolding may be mounted to the conveyor frame or curvilinear structure 114.

The lid 120 may be removable as a whole unit or divided into removable lid sections, 120A, 120B, 120C, 120D, as shown in FIG. 3. The lid sections may be held to the conveyor 110 by releasable pins. The releasable pins are disposed through the conveyor frame, trusses 122, or curvilinear structure 114. The divided and removable lid sections provide access to the interior of the curvilinear structure. Removable lid sections aid in the maintenance and cleanout of the conveyor 110. The removable lid sections may allow the operator or installer to optimize adjustment and efficient placement of mixing baffles and ports. Access ports (not shown) may be disposed within the lid sections to allow the application of treatment material during conveyance, such as blending dry additives or mixing powdered, dry seed treatment with the seed flow. Dry additives may include biological inhibitors, particulate fertilizer, seed shiners, drying agents, talc, graphite, or other flowability agents and other seed treatments. Access ports may be covered with a transparent cover for observation. The access ports within the lid section may be of varied sizes and shapes. The conveyor may also include passive zones where mixing baffles or ports in the removable lid sections are not utilized.

Since treatment absorbs or dries quickly with some seeds, such as wheat, mixing may need to occur further upstream prior to entering the tail inlet of the static mix conveyor. A transition zone 200 may be utilized at the tail end of the conveyor 110 as shown in FIGS. 3 and 4. The transition zone is the portion of the conveyor where the belt transitions from a flat profile from the drive or idler roller, usually where loading of the conveyor happens, into the curvilinear portion where the belt conforms to the curvilinear portion. The transition zone may incorporate one or more mixing paddles 230 to induce mixing prior to inline static mixing within the conveyor 110. As shown, two mixing paddles may be disposed within the transition zone. Placement of the mixing paddles 230 in the transition zone 200 allows for more aggressive mixing prior to mixing within the static mix conveyor. The mixing paddles partially obstruct the flow of seed, inducing a prescribed amount of backflow within the transition zone.

Figure 5:
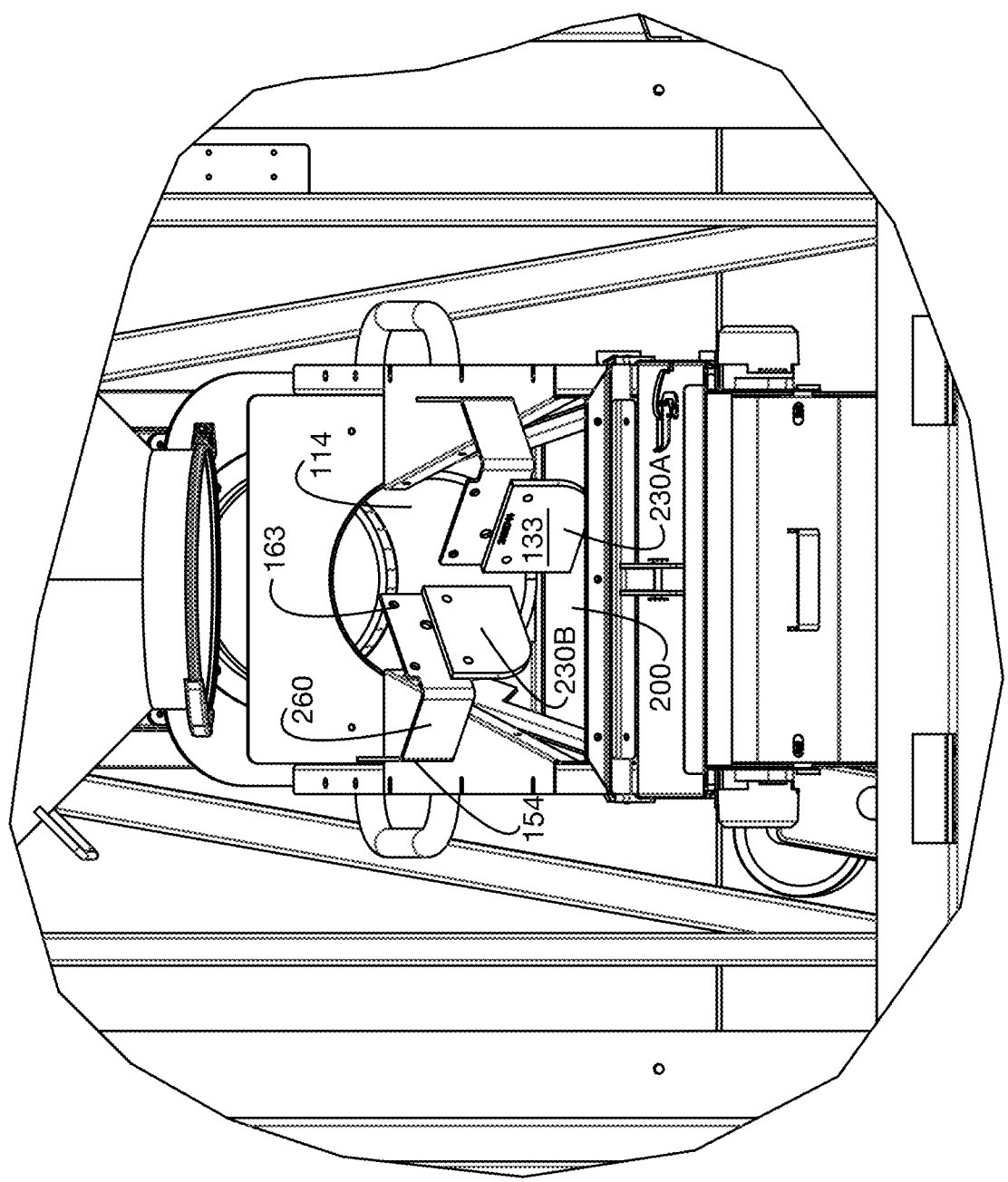
FIG. 5 shows a front close-up view of the transition zone showing the alternating mixing paddles in place.

The mixing paddles 230 may be mounted to a sidewall 154 of the transition zone as shown in FIG. 5. The mixing paddles 230 are mounted perpendicular to the floor of the transition zone with a U-shaped mounting bracket 260, as shown in FIG. 5. A U-shaped mounting bracket 260 is attached to the sidewall 154 of the transition zone. The U-shaped mounting bracket and sidewall may comprise a plurality of apertures 163 corresponding to the mounting position of the mixing paddles. The mixing paddles are mounted to the sidewall 154 with a peripheral portion disposed upstream of a central portion. The first mixing paddle 230A is mounted on the second lateral side 172 of the transition zone. The first mixing paddle 230A is slanted relative to the longitudinal portion 111 of the transition zone 200 as shown in FIG. 3. The slant of the mixing paddle directs lateral movement of the particulate material from the second lateral side 172 towards the first lateral side 170 within the transition zone 200 and partially determines how aggressive the mixing rate is. In addition, mounting a second mixing paddle 230B on an opposite sidewall 154 and slanted relative to the longitudinal portion 111 of the transition zone directs lateral movement of the particulate material from the first lateral side 170 back towards the second lateral side 172 of the transition zone. The particulate material ricochets off an upstream surface 133 of each mixing paddle, bouncing particulate material backwards and towards an opposite sidewall 154 within the transition zone. In the situation where the particulate material is a quantity of a plant seed partially covered with a wet seed treatment, inducing backflow, and directing lateral movement within the transition zone spreads the wet seed treatment about the quantity of the plant seed sooner than can occur within the conveyor 110. Alternatively, the mixing paddles 230 may be oriented 90-degrees to the previous position so they are on the same plane as the floor of the transition zone. Such orientation allows particulate material to flow over the mixing paddles in a cascading manner under the force of gravity.

Figure 6:
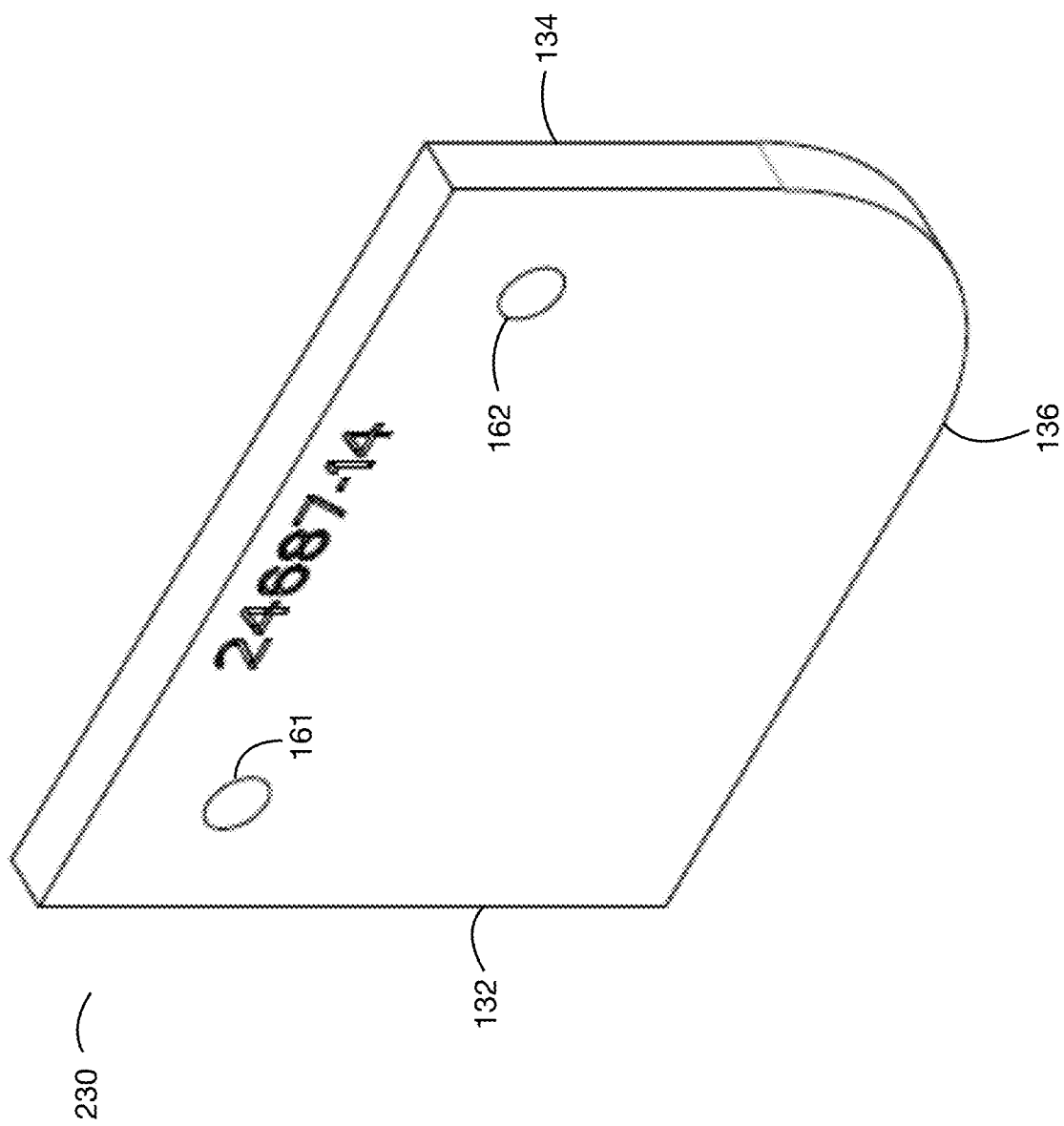
FIG. 6 shows a top-side perspective view of a mixing paddle.

The mixing paddles 230 may be made of a rigid durable material such as ultra-high-molecular-weight polyethylene, acrylonitrile butadiene styrene, or steel. As shown in FIG. 6, the mixing paddle 230 may comprise a first aperture 161 and a second aperture 162 for securing the mixing paddle to the U-shaped mounting bracket 260 or other mounting bracket. The mixing paddle 230 may comprise a central downward extending portion, a peripheral downward extending portion, and a lower portion that extends laterally in one or both lateral directions. In FIG. 6, the mixing paddle does not comprise a passage, and the downward extending section, the central portion 132 and the peripheral portion 134 form a uniform mixing paddle. The lower portion 136 extends laterally. The peripheral portion 134 and the lower portion 136 of the mixing paddle comprise an arc having a profile corresponding to the shape of the belt within the transition zone. The belt within the transition zone is not curved to the same extent as when the belt rides within the curvilinear structure 114 owing to the more planar cross section of the transition zone 200. The lower portion 136 is disposed near the carrying surface of the belt to engage the bottom of the stream of particulate material. The laterally extending portion may be semi-circular, otherwise curvilinear, rectangular, or other shape to fit the confines of the transition zone to induce thorough mixing. The mixing paddles 230 may be a solid piece or have passage cutouts. The mixing paddle may have one or multiple passages to induce increased flowability of material through the transition zone. The size and angle of the mixing paddles may also be changed to induce transfer of particulate material. The mixing paddles can be mounted at less than a 50° angle as previously defined for example.

There is a compromise between particulate material transfer rate and the amount of mixing—the more backflow and lateral movement is induced, the less downstream movement there is of the particulate material. The mixing baffles reduce the transfer rate by between 30%-70%, or between 40%-60%, or, in a preferred embodiment, approximately 50%. For example, in a conveyor having a transfer rate of 900 kilograms (approximately 2,000 pounds) per minute without mixing paddle, at 28° incline and with a belt speed of 110 meters per minute (approximately 350 feet per minute), the addition of mixing baffles may reduce the transfer capacity to 450 kilograms (approximately 1,000 pounds) per minute. In a larger conveyor having a transfer capacity of 1,800 kilograms (approximately 4,000 pounds) per minute, at 28° incline and with a belt speed of 110 meters per minute (approximately 350 feet per minute), the addition of mixing baffles may reduce the transfer capacity to 900 kilograms (2,000 pounds) per minute.

Figure 7:
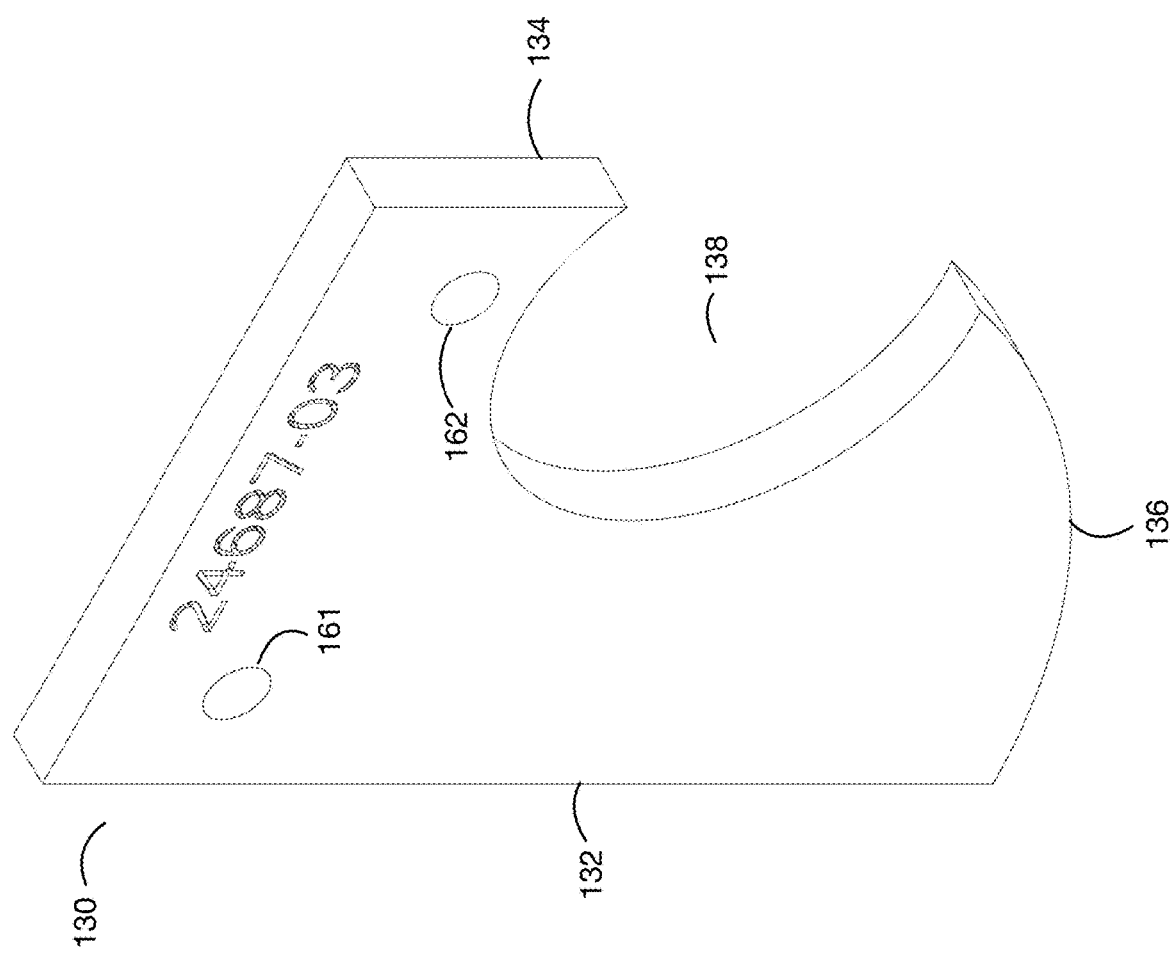
FIG. 7 shows a top-side perspective view of a mixing baffle.
Figure 8:
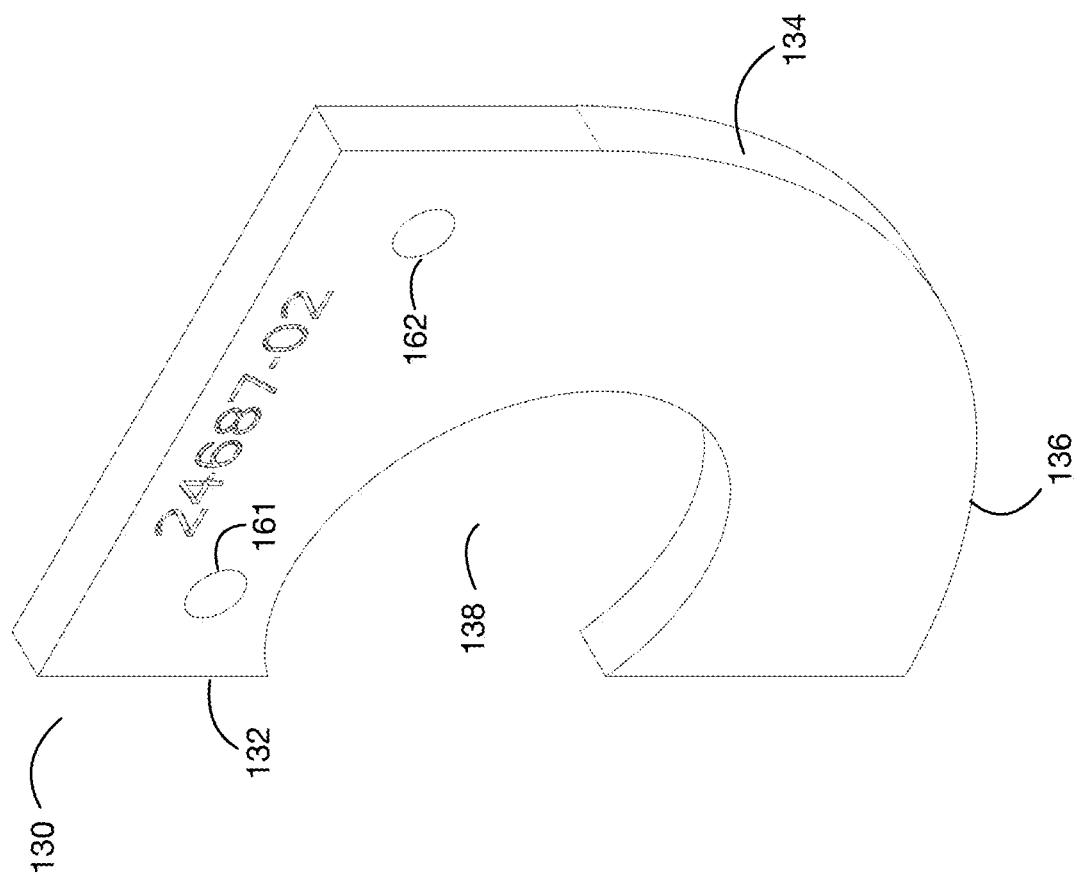
FIG. 8 shows a top-side perspective view of a mixing baffle.

To provide a thorough mixing while maintaining flow rates, a passage 138 can be provided in one or more of the mixing baffles 130 or mixing paddles 230. A mixing baffle 130 is shown in FIG. 7 having a passage 138 disposed in a peripheral portion 134 of the mixing baffle. Alternatively, a mixing baffle 130 is shown in FIG. 8 having a passage 138 disposed in a central portion 132 of the mixing baffle to induce thorough mixing and material transfer. The lower portion 136 of the mixing baffle comprises an arc having a profile corresponding to the curvilinear structure 114. The lower portion 136 of the mixing baffles and paddles are disposed near the carrying surface of the belt to engage the bottom of the stream of particulate material. In the example of a seed treatment system, the belt may incorporate texture projections on the carrying surface to assist with traction for carrying the load up an incline, such as raised chevrons that assist with carrying the load. The lower portion 136 of the mixing baffles and paddles are disposed at a predetermined distance from the raised chevrons. The bottom of the mixing baffles and paddles may be located above the raised chevrons by less than three average diameters of the particulate material, or less than five average diameters of the particulate material, or less than 10 average diameters of the particulate material. Alternatively, the bottom of the mixing baffles and paddles may be located above the raised chevrons by approximately 0.5 cm (approximately ¼ inch), 1 cm (approximately ⅜ inch), 2.5 cm (approximately 1 inch). Similarly, the arc of lower portion 136 of the mixing baffle follows the belt conformed to the curvilinear structure 114 around to the sidewall 154 at a similar spacing. Having a space in between the top of the belt texture and the bottom of the mixing baffles and paddles prevents seed damage from friction or pinching.

Figure 9:
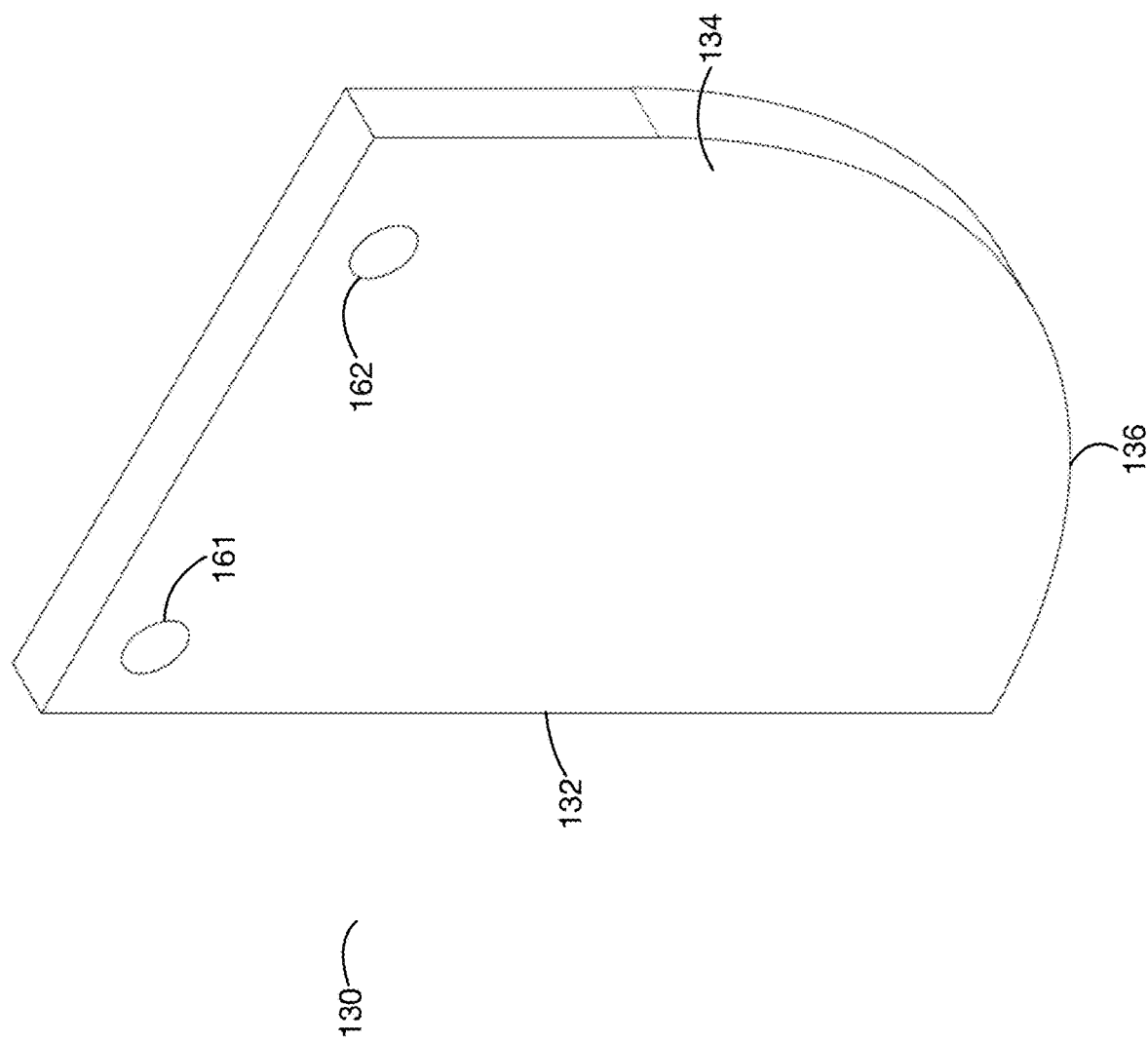
FIG. 9 shows a top-side perspective view of a mixing baffle.

As shown in FIG. 7, the mixing baffle 130 comprises a first aperture 161 and a second aperture 162 for securing the mixing baffle to a mounting bracket 160. The mixing baffle also comprises a downward extending section. In FIG. 7, the downward extending section is the central portion 132. The lower portion 136 extends laterally. Alternatively, as shown in FIG. 8 the downward extending section is the peripheral portion 134. In both FIGS. 7 and FIG. 8, the mixing baffle 130 has a downward extending portion and a lateral extending portion. The passage 138 may be semi-circular, otherwise curvilinear, rectangular, or other aperture shape to allow a top portion of the seed stream to flow over the lower portion 136. The mixing baffle 130 shown in FIGS. 7 and 8 having a semi-circular passage 138 induces thorough mixing and material transfer. In FIG. 9, there is no passage disposed in the mixing baffle 130. Alternatively, the mixing baffle 130 may have a central downward extending portion and have a lower portion that extends laterally in one or both lateral directions. The mixing baffle 130 may have one or multiple passages therethrough.

The mixing baffles 130 and mixing paddles 230 may have a tapered or beveled edge. The peripheral portion 134 and the lower portion 136 of the mixing baffles and paddles may be tapered or beveled. The passage 138 of the mixing baffles or paddles may also be tapered or beveled individually, or in combination with the peripheral portion 134 and the lower portion 136. The tapered or beveled edges of the mixing baffles and paddles may be angular or rounded. The rounded edge makes for a smoother surface for seed to slide over during material transfer. The angular edge may be 90 degrees or canted to less than a 90-degree angle.

The mixing baffle 130 can be statically mounted to the lid 120, the conveyor frame (not shown), or the curvilinear structure 114. The statically mounted mixing baffle can be bolted or welded within the curvilinear structure, or otherwise securely mounted within the curvilinear structure. Alternatively, the mixing baffles and paddles can be adjustably mounted, where the mixing baffles and paddles can be selectively deployed. An acme screw, spring, pneumatic device, or hydraulic actuator may be used in adjusting the pitch of the mixing baffles within the curvilinear structure. The mixing baffle 130 can be mounted to a hinge bracket. The hinge bracket may comprise an actuator, spring, acme screw or other deploying mechanism. In this way, the mixing baffle can be selectively deployed to enable the conveyor to have a transfer-speed-maximizing mode and a mixing mode. The hinge bracket may be limited at an angle less than or equal to 90 degrees.

Figure 10:
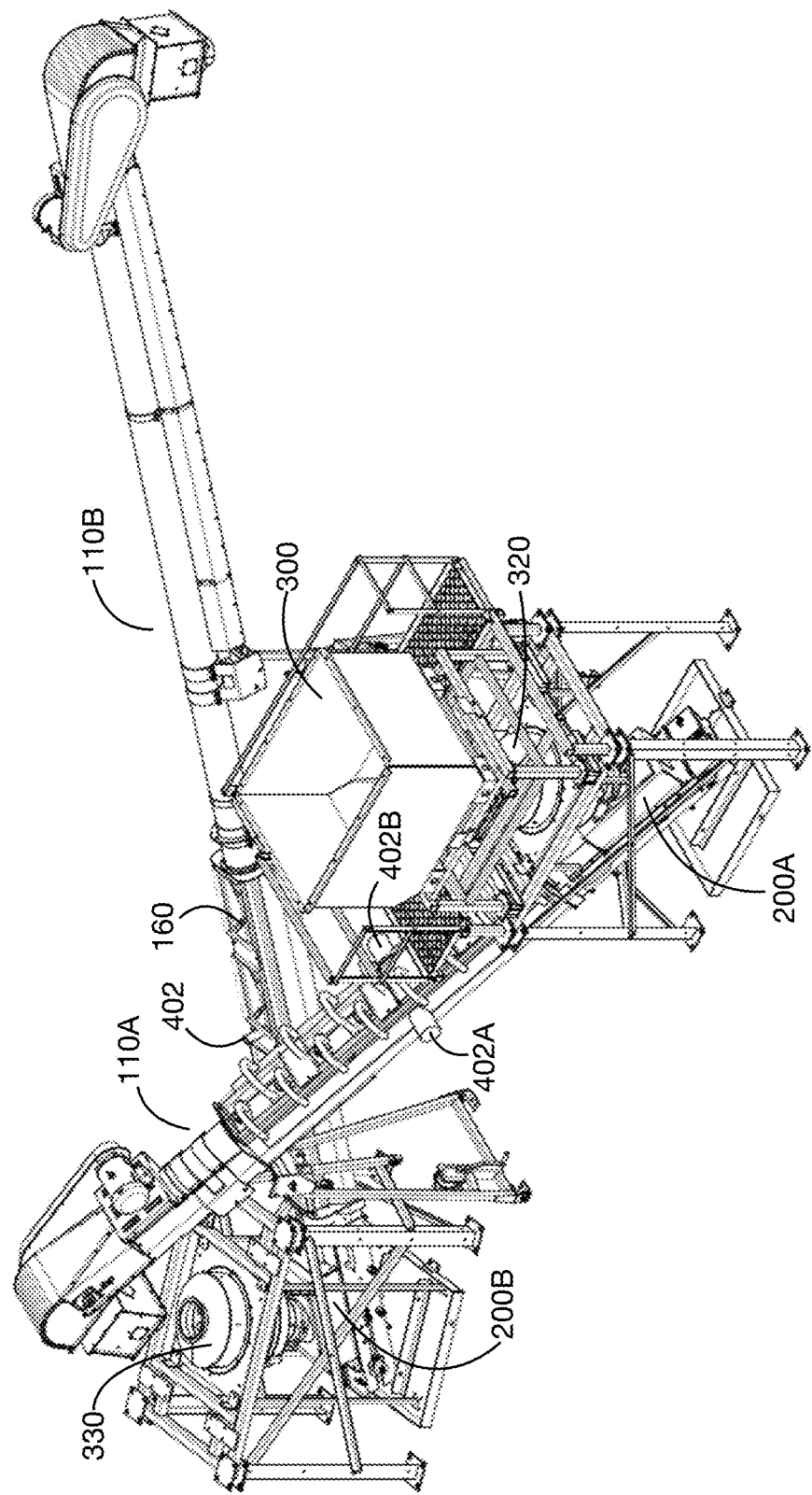
FIG. 10 shows a top-side perspective view of a multiple stage seed treater using conveyors for mixing and drying.
Figure 11:
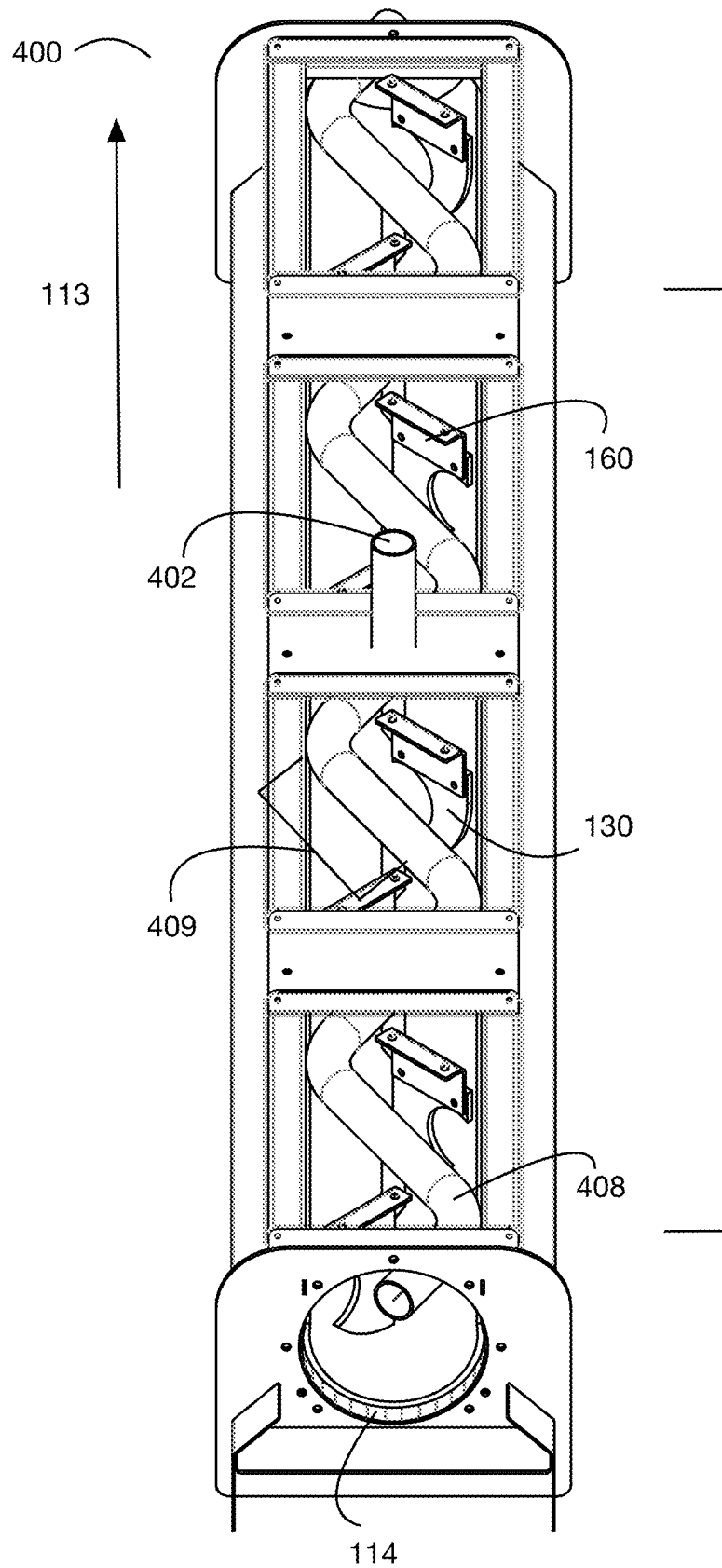
FIG. 11 shows a top perspective view of a conveyor having mixing baffles and a conditioning apparatus disposed within a curvilinear structure.

The conveyor 110 may apply continuous static mixing, drying, or conditioning of seed in multiple stages. An advantage of staging mixing and drying conveyors between seed treatment applicators allows employment of multiple seed treatments between stages of conditioning. The static mixing of seed in multiple stages within static mix conveyors allows for additional mixing, drying, and conditioning time for seed treatments requiring longer durations. Alternative treatments may be utilized with mixing and drying conveyors having a plurality of removable lid sections and ports. Alternative treatments may include introducing dry additives, blending powdered, dry seed treatment, or a combination thereof. As shown in FIG. 10, a seed package (not shown) is deposited into a hopper 300 allowing the seed to flow through a seed flow control meter, such as a loss-in-weight seed flow control solution utilizing a variable position gate sold by KSi Conveyor, Inc., Sabetha, Kansas as the KSi® VariRate® loss-in-weight seed meter or a volumetric seed wheel (for example, the disclosure of U.S. patent application Ser. No. 12/848,412 by Reineccius). The metered seed flow then enters a first seed treatment applicator 320. The first seed treatment applicator applies a first treatment to the seed flow. According to a recipe, the first seed treatment applicator applies a predetermined amount of the first treatment based on the metered seed flow rate. The seed flow having a first treatment enters a transition zone 200A of a first conveyor 110A, where mixing baffles may mix the freshly treated seed as described above.

The first conveyor 110A transports the seed flow towards a second seed treatment applicator 330. After mixing of the first application of seed treatment within the first conveyor 110A, the first static mix conveyor deposits the metered seed flow into the second applicator for a second treatment. A second metering step is not needed, because the flow of seed through the first applicator and through the first conveyor maintains the seed flow rate. Maintaining the metered seed flow through the first applicator, the first conveyor, and the second applicator may provide an advantage for overtreating because the seed moves continually through the system, without the need to collect the treated seed in a bag, box, or hopper, where the seed must be re-metered.

The second seed treatment applicator 330 applies the second treatment to the metered seed flow. The seed flow treated with a second second treatment then enters a transition zone 200B of a second conveyor 110B, where mixing can begin as described above. After conditioning within the second static mix conveyor, the seed flow may be collected into a package (box, bag, etc.) or dispensed into a customer transport container (such as a trailer, wagon, planter, etc.). Additional seed treatment may be realized by including additional stages of treatment and mixing with a similar arrangement or even repeat prior treatments. Treatment of seed in multiple stages allows for consecutive coatings or layers of treatment around the seed. Treatments may comprise a, fungicide, insecticide, fertilizer, mineral additives, inhibitors, bacteria, microbial, or stimulators. When seed treatment is performed in multiple stages, we discovered there is better process control. Metering the seed flow at the start of the process, the remaining steps can maintain a seed flow rate of around 360 kilograms (approximately 800 pounds) per minute through multiple conveyors and seed treatment applicators, without a need for a subsequent metering step.

Figure 12:
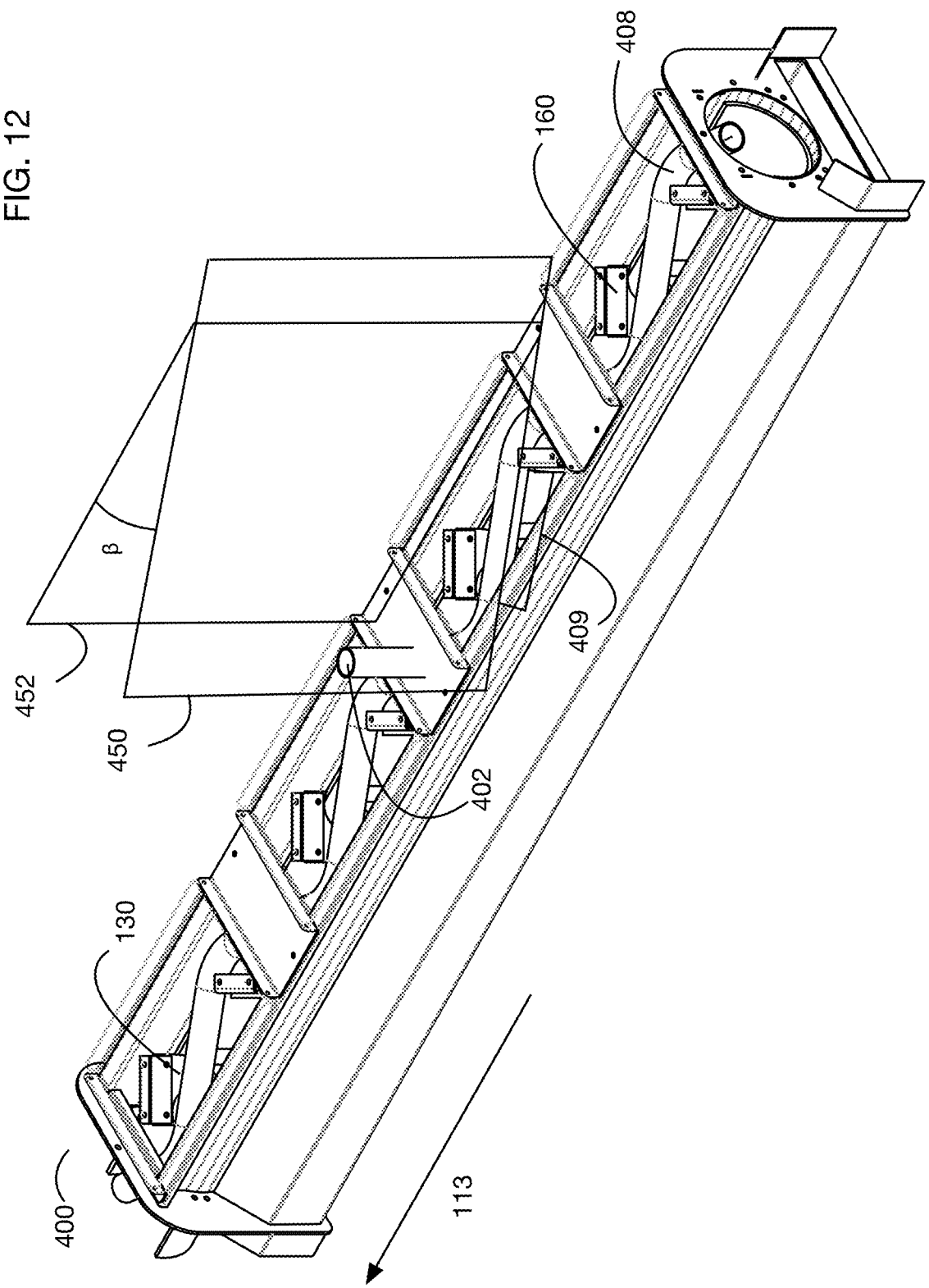
FIG. 12 shows a top-side perspective view of a conveyor having mixing baffles and a conditioning apparatus disposed within the curvilinear structure.
Figure 13:
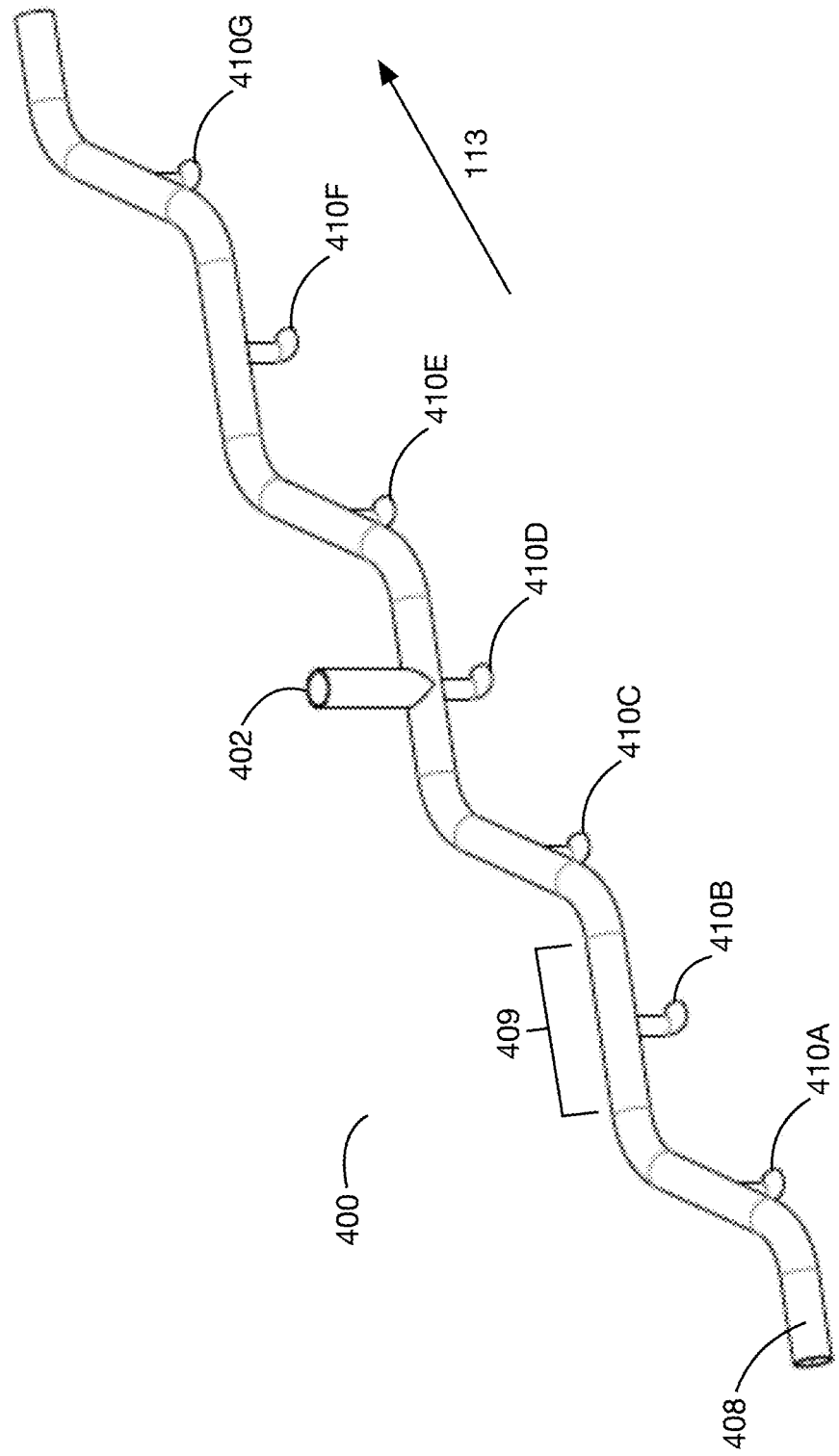
FIG. 13 shows a top-side perspective view of a conditioning apparatus.

The conveyor 110 may be made operably connected to a pressurized gas source to induce positive pressure within the conveyor atmosphere. As shown in FIGS. 10 and 12, the conveyor 110 may comprise a conditioning apparatus 400 having a plurality of ports made operably connected to a gas manifold 408. As particulate material passes through the conveyor, the conditioning apparatus effectuates drying and conditioning of the stream of particulate material. The gas manifold may be made operable by at least one inlet port 402 disposed through the curvilinear structure 114 or lid 120. The inlet port 402 may introduce conditioned air at any point along the longitudinal portion 111 of the conveyor 110. Conditioned air assists in the cooling and drying of the wet, freshly treated seed during conveyance by the belt within the conveyor. Conditioned air may come from any conditioning source such as an air conditioner or dehumidifier. Alternatively, the conditioned air may be introduced into the conveyor 110 through a plurality of lines connected to multiple ports disposed within the curvilinear structure 114 or lid 120. The gas manifold 408 may be made from any hose type or material such as metal pipe, formed hard plastic, and other durable materials having an inner flowable passage. The gas manifold may include a plurality of conditioning outlets 410 disposed through the wall of the gas manifold. The gas manifold containing conditioning outlets introduces conditioned air to specific areas within the seed flow. The conditioning outlets may be made from any hose type or material such as metal pipe, formed hard plastic, and other durable materials having an inner flowable passage. The gas manifold 408 may be disposed within the curvilinear structure 114 of the conveyor 110. The gas manifold may be placed above or below the movable belt. The gas manifold 408 may follow a path within the curvilinear structure 114 congruent with the passages disposed in the mixing baffles 130. Alternatively, the gas manifold may contain a plurality of conditioning sections at less than a 50° angle (see angle β in FIG. 12) between a first plane 450 defined by a conditioning section 409 and a vertical plane 452 tangential to the longitudinal portion 111 of the conveyor 110 at the sidewall 154. In the situation where the particulate material is a quantity of a seed covered with a wet seed treatment, a conditioning outlet 410 may be positioned within the seed flow at a point laterally adjacent to a mixing baffle 130. The conditioning outlets, as shown in FIG. 13 and FIG. 15, may direct pressurized gas in a downstream direction (arrow 113), upstream direction, or a lateral direction for drying wet seed treatment about the quantity of the plant seed as well as directing longitudinal movement of the seed flow.

Figure 14:
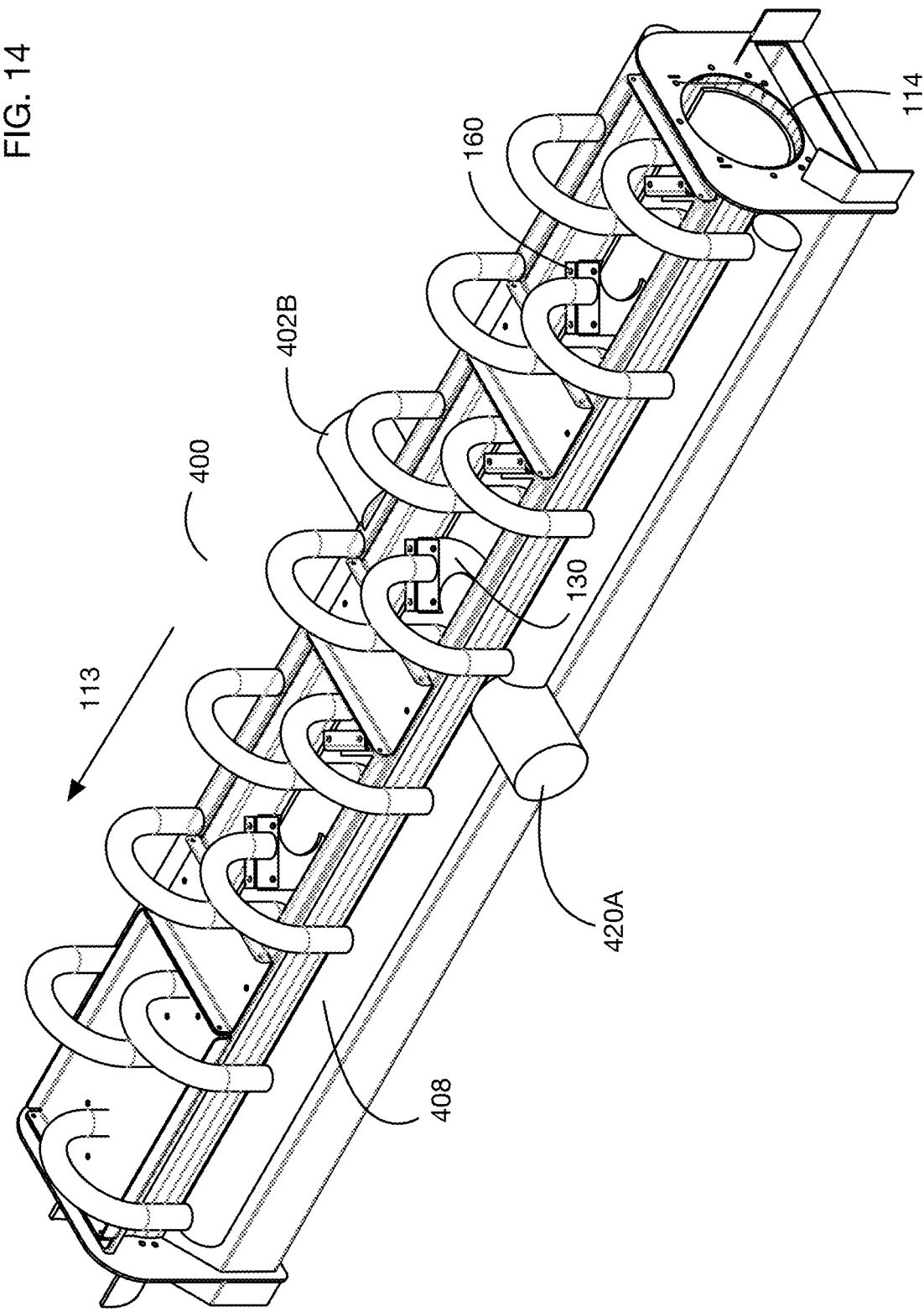
FIG. 14 shows a top-side perspective view of a conditioning apparatus having two gas manifolds mounted to the exterior portion of the curvilinear structure.

Alternatively, the conditioned air may be introduced into the conveyor 110 via a gas manifold 408 disposed outside the curvilinear structure 114 or mounted on an exterior portion of the conveyor 110 as shown in FIG. 14. The gas manifold may include a plurality of conditioning outlets 410 disposed through the lid 120 of the conveyor 110. As shown in FIGS. 14 and 15, the conditioning outlets 410 may direct pressurized gas in a perpendicular plane to the downstream direction (arrow 113) flow of particulate material. Alternatively, the conditioning outlets 410 may be positioned directly within or below the seed flow to introduce conditioned air to specific areas around or within the seed flow, such as directly downstream of a mixing baffle. In the situation where particulate material is a quantity of a seed covered with a wet seed treatment, a conditioning outlet 410 may be positioned at a point where seed flow experiences greatest turbulence from backflow induced by the mixing baffles 130.

In another function, the plurality of conditioning outlets 410 may effectuate extraction by forming a vacuum when the inlet port 402 is operably connected with a vacuum source. The applied vacuum within the gas manifold 408 effectuates air currents within the conveyor 110 to entrain and extract lighter particles such as debris, chaff, dust, humidity, or excess treatment. Alternatively, conditioned air may be introduced in combination with extraction. In one example, as depicted in FIGS. 14 and 15, extraction is applied to a first inlet port 402A connected to a first gas manifold 408A, while conditioning is applied to a second inlet port 402B connected to a second gas manifold 408B. The combination induces positive flow of conditioned air through the seed flow while vacuuming draws the lighter, entrained particles out of the seed flow. The conditioning outlets serving as extraction ports may be screened to prevent particulate material from entering the conditioning outlets.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

In the Summary above, the Detailed Description, and in the accompanying drawings, reference is made to particular features including method steps of the invention. The reader should understand that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally. It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The term "comprises", and its grammatical equivalents are used in this document to mean that other components, steps, etc. are optionally present. For example, an article "comprising" or "which comprises" components A, B, and C can consist of components A, B, and C, or can contain not only components A, B, and C but also one or more other components.

We claim:
1. A seed treatment method comprising the steps of:
   a. treating a flow of seed with a liquid seed treatment within an applicator to form a flow of treated seed;
   b. moving the flow of treated seed up an incline conveyor that is vertically disposed beneath the applicator; and
   c. mixing the flow of treated seed with a paddle mounted in a transition zone of the incline conveyor, wherein the transition zone is the portion of the incline conveyor where a belt transitions from a flat profile into a curvilinear profile.
2. The method of claim 1, further comprising the step of:
   a. forming an eddy in the flow of treated seed downstream of the paddle.
3. The method of claim 1, further comprising the step of:
   a. cascading a quantity of the treated seed within the incline conveyor due to the paddle.
4. The method of claim 1, further comprising the step of:
   a. distributing the liquid seed treatment about a quantity of the treated seed within the flow of treated seed.
5. The method of claim 1, further comprising the step of:
   a. inducing a prescribed amount of backflow in the flow of treated seed, wherein the prescribed amount of backflow is contrary to conveyance of a substantial amount of the flow of treated seed up the incline conveyor.
6. The method of claim 1, further comprising the step of:
   a. dispensing until complete cleanout of the flow of treated seed through a head end of the incline conveyor.
7. The method of claim 1, further comprising the step of:
   a. maintaining the flow of treated seed at a metered rate through the applicator and the incline conveyor.
8. The method of claim 1, further comprising the step of:
   a. mixing the flow of treated seed with paddles disposed within a transition zone of the incline conveyor.
9. A seed treatment method comprising the steps of:
   a. treating seed with a liquid seed treatment;
   b. moving a flow of treated seed through a transition zone of an incline conveyor; and
   c. mixing the flow of treated seed with a paddle disposed in the flow of treated seed within the transition zone, wherein the transition zone is the portion of the incline conveyor where a belt transitions from a flat profile into a curvilinear profile.
10. The method of claim 9, further comprising the step of:
    a. dispensing until complete cleanout of the flow of treated seed through a head end of the incline conveyor.

11. The method of claim 9, further comprising the step of:
a. maintaining the flow of treated seed at a metered rate through an applicator and the incline conveyor.

12. The method of claim 9, further comprising the step of:
a. inducing backflow within the transition zone.

13. The method of claim 9, further comprising the step of:
a. distributing the liquid seed treatment about a quantity of the treated seed within the flow of treated seed.

14. A seed treatment method comprising the steps of:
a. treating a flow of seed with a liquid seed treatment within an applicator to form a flow of treated seed;
b. moving the flow of treated seed up an incline conveyor;
c. mixing the flow of treated seed with a paddle mounted to a transition zone of the incline conveyor, wherein the transition zone is the portion of the incline conveyor where a belt transitions from a flat profile into a curvilinear profile; and
d. maintaining the flow of treated seed at a metered rate through the applicator and the incline conveyor.

15. The method of claim 14, further comprising the step of:
a. mixing the flow of treated seed within the transition zone of the incline conveyor.

16. The method of claim 14, further comprising the step of:
a. mixing the flow of treated seed with paddles disposed within a transition zone of the incline conveyor.

17. The method of claim 14, further comprising the step of:
a. inserting the paddle into the flow of treated seed within the transition zone of the incline conveyor.

18. The method of claim 17, wherein the paddle is mounted to a sidewall of the transition zone.

* * * * *